March 8, 1927.  W. J. GAVEN  1,620,538

METHOD OF MAKING COMPOSITION ARTICLES

Filed May 18, 1923

INVENTOR
William Joseph Gaven
BY C. P. Goepel
ATTORNEY.

Patented Mar. 8, 1927.

1,620,538

UNITED STATES PATENT OFFICE.

WILLIAM JOSEPH GAVEN, OF WILKES-BARRE, PENNSYLVANIA, ASSIGNOR OF ONE-HALF TO MARY ELLEN GAVEN, OF WILKES-BARRE, PENNSYLVANIA; MARY E. GAVEN ADMINISTRATRIX OF THE SAID WILLIAM J. GAVEN, DECEASED.

METHOD OF MAKING COMPOSITION ARTICLES.

Application filed May 18, 1923. Serial No. 639,743.

This invention relates to composition articles and method of making same and has for its object to provide an improvement over composition articles as heretofore made.

Heretofore it has been customary to make composition articles, as panels, knobs, devices for radio sets and other composition articles from a rubber composition of well-known constituents and this composition was formed into plates of various sizes and when completed was quite hard. These plates were then placed into molds and under heat and pressure were formed into the articles desired. Among the objections to the former method was that the plates being hard and set required considerable heat and pressure to form into the articles desired. And also on the objection that these plates could not be sawed into shape when it was desired to utilize smaller sizes.

Because the plates were of the composition material and the articles made therefrom were throughout their thickness of this material, the expense was considerable, as a large amount of material was necessarily required for the making of such plates and the articles produced therefrom.

The object of the present invention is to produce a more economical article than heretofore, to render the same stronger, lighter, more durable and more flexible, and to enable the manufacture to be conducted more expeditiously, and with less labor than possible in the known methods heretofore employed.

For this purpose my invention consists in the provision of separate layers of non-plastic material, as paper or the like, which provide a thin coating on one or both sides with composition matter.

The invention will be more fully described hereinafter and finally pointed out in the claim.

Figure 1:
Figure 2:
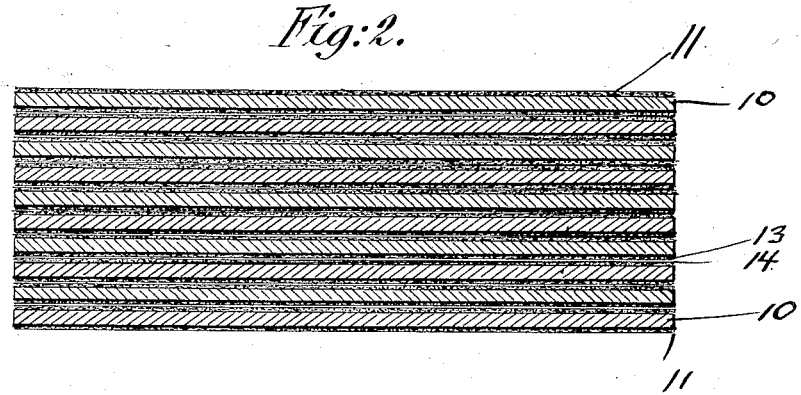

In the accompanying drawing, Figure 1 shows a sectional view of my improved layer made in accordance with my invention, and Fig. 2 shows a plurality of layers superimposed prior to being placed into the molds to be shaped into articles.

Similar letters of reference indicate corresponding parts throughout the various views.

Referring to the drawings, a piece of non-plastic material as paper or the like indicated by 10 has sprinkled thereon a layer 11 of plastic material. This second layer is made of ground composition matter. This composition matter has the same constituents as the old composition heretofore used and differs therefrom only in that the old plates of composition matter are translated into a ground powder. Among such compositions, one may be referred to, to wit:

1 lb. clarite; 1 lb. gutta percha; 1 lb. rags or shoddy; 3 lbs. gum and coloring matter to suit.

This ground powder is then sprinkled upon a layer or a sheet of paper or the like and subjected to heat sufficient to cause the ground powder to adhere to the layer of paper, or the like and then these sheets of combined paper and powder are allowed to dry and are ready for use. In the use of these sheets several of them, depending upon the thickness desired, are superimposed one between the other, either a plurality of sheets like Figure 1 are superimposed one on the other as such sheets, but in the plastic material on both sides thereof are superimposed one on the other as indicated in Figure 2. In each case the top-most or lowermost layer is formed from such sheets that have been sprinkled on both sides, as at 13 or 14. This plurality of sheets are then placed into a mold and subjected to heat and pressure and by virtue thereof the composition strata are softened and further forced into the paper and all these sheets are tightly compressed together into the shape desired to be given the article. The presence of the paper having been compressed under heat and pressure combined with the composition matter in sprinkled or powdered form produces a resultant article of great compactness and strength, as it is well-known that compressed paper gives articles a great strength and durability and this characteristic fact is augmented by the presence of the composition matter, which as described has been subjected to heat and pressure.

These sheets of paper, or the like with the sprinkled powder thereon can be made of any size and can be most readily cut to any size so as to conform in general to the outline desired to be given the article to be made.

By my invention the tendency of the composition to become hard or set before the pressure is closed on the heated form thereof is avoided and the composite layers yield more readily to pressure and do not require that the composition be heated to the extent of providing a more free flowing composition, and the cost of the end products is considerably reduced.

Instead of paper or the like, veneer wood may be used.

The result of the improved method is further the attainment of truer surface and greater compactness throughout the sprinkling of the powder on each surface of the layers having the effect of obviating the inconveniences which result in the old methods.

A further object is that the trimming or edging of articles made by my improved method is obviated and the labor is thereby correspondingly reduced.

The dies or molds that are used to form my sheets into shape may be operated by hydraulic and steam or other power and devices of this kind are well-known and any improved form thereof is suitable to carry out my invention.

From the above it has been seen that the invention resides in an improved composition article and the method of making the same in that a sheet having a strong surface of composition matter adhering thereto is provided and in that a plurality of such sheets with composition matter sprinkled thereon are formed into the shape of the article desired.

What I claim as new and desire to secure by Letters Patent, is:

That method of making a composition article which consists in treating a layer of paper with a coating of powdered composition matter possessing ornamental and adhesive qualities, subjecting the layer of paper and the coating of composition matter to heat for uniting the two, superposing a plurality of such coated layers of paper, and subjecting the superposed coated layers to heat and pressure for molding the same to the configuration of the article desired.

In testimony that I claim the foregoing as my invention, I have signed my name hereunder.

WILLIAM JOSEPH GAVEN.